June 2, 1925.  1,540,178

B. MOEGLING

ELECTRICAL COOKING APPARATUS

Filed Aug. 29, 1921

Patented June 2, 1925.

1,540,178

UNITED STATES PATENT OFFICE.

BRUNO MOEGLING, OF BERLIN, GERMANY, ASSIGNOR TO THE FIRM OF AUERLICHT GESELLSCHAFT M. B. H., KOMMANDITGESELLSCHAFT, OF BERLIN, GERMANY.

ELECTRICAL COOKING APPARATUS.

Application filed August 29, 1921. Serial No. 496,523.

(GRANTED UNDER THE PROVISIONS OF THE ACT OF MARCH 3, 1921, 41 STAT. L., 1313.)

*To all whom it may concern:*

Be it known that I, BRUNO MOEGLING, a citizen of the United States, residing at Berlin, Germany, have invented certain new and useful Improvements in Electrical Cooking Apparatus, of which the following is a full, clear, concise, and exact description, reference being had to the accompanying drawing, forming a part of this specification, and for which I have filed applications for patents as follows: In Germany, filed 12 December, 1914; Austria, filed 9 April, 1915; Switzerland, filed 9 April, 1915; Great Britain, filed 28 May, 1915; Denmark, 11th November, 1919; France, 19 January, 1920; Norway, 19 November, 1919; Czechoslovakia, 24 February, 1920; Sweden, 6 November, 1919; Belgium, 17 January, 1920; Italy, 14 February, 1920; and Poland, 17 March, 1920.

This invention relates to an electrical cooking apparatus.

It is already known, in connection with electrical cooking apparatus, to solder bolts to the surfaces to be heated, by means of which bolts the heating body is pressed against said surfaces by the aid of a rigid clamping member. With this arrangement, however, it is possible that, on account of the alteration of shape of the parts which takes place during the heating operation, layers of air may be formed between the heating body and the surfaces to be heated, which layers of air render difficult the transmission of heat and lead to overheating of the heating body. The clamping member has also a large capacity for heat and therefore affects adversely the efficiency of the apparatus.

In accordance with the present invention these disadvantages are avoided by rendering possible the pressing of the heating body against the vessel to be heated without the utilization of rigid clamping members.

Figure 1:
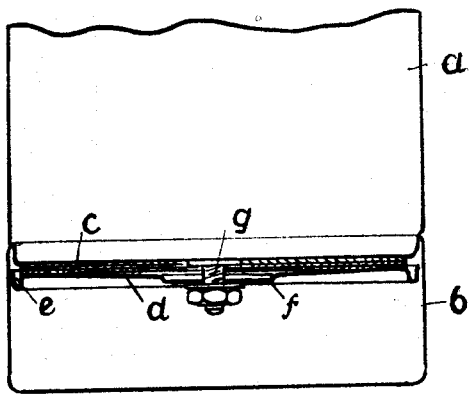
Figure 2:
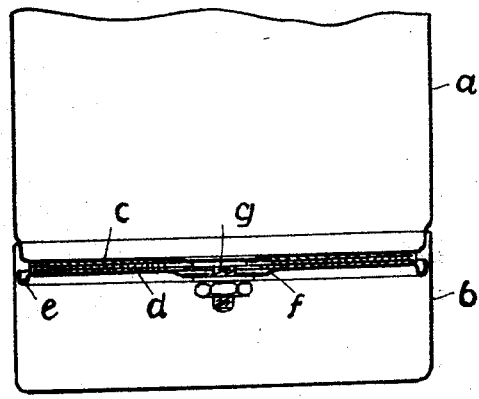

The invention is illustrated by way of example in the accompanying drawings in which Figs. 1 and 2 are sectional views, Fig. 1 showing the parts assembled before they are brought into position for use and Fig. 2 showing the heating body pressed tightly against the surface to be heated.

The vessel $a$ to be heated has a flat bottom to the centre of which is brazed the bolt $g$. Between the heating body $c$ and the nut of the bolt $g$ is interposed a slightly conical pressure plate or clamping member $d$ which is formed with a rim $e$ at the outer edge and with a dished portion $f$ in the middle. The bottom of the cooking vessel is covered by the cowl $b$.

The pressure plate, which at first only bears at its edge, is tightened up by the nut until it becomes flat and bears with the whole of its surface, except the dished portion $f$ on the heating body $c$. On screwing up the nut, the bottom of the vessel, around the base of the screw bolt $g$, is pulled down somewhat as shown in Fig. 2; this action contributes to the result that also during the period of heating up the heating body bears with its whole surface on the bottom of the vessel, the internal stresses initially imparted contributing to the maintenance of thermal contact. The thickness of the pressure plate $d$ and the angle of the cone are such that on screwing up the nut the pressure plate $d$ is brought into flat form without distortion of the flat shape of the bottom of the cooking vessel except at the place where the bolt is brazed thereto.

The pressure plate is always so shaped that it bears at first only at the edge and only after tightening up the fastening screw does it assume a shape equidistant from the surface to be heated.

Having thus described my invention what I claim as new and desire to secure by Letters Patent, is:

1. In an electrical heating apparatus having a heating body and a surface to be heated to which the heating body is applied, a pressure plate previously being slightly conical and bearing only on the edge before being tightened up and means for forcing said pressure plate against said heating body so as to assume a plane shape bearing on the whole lower surface of said heating body.

2. In an electrical heating apparatus having a heating body and a surface to be heated to which the heating body is applied, a pressure plate previously being slightly conical and bearing only on the edge before being pressed to said heating body and fastening means fixed to the centre of said surface to be heated and forcing said pressure plate against said heating body so as to assume a plane shape being in contact with said heating body substantially throughout its area.

3. An electrical heating apparatus comprising in combination a heating body, a flat bottom to be heated to which said heating body is applied, a pressure plate previously being dished and bearing only on its edge before being pressed to said heating body and a fastening screw fixed to the centre of said bottom to be heated and, when screwed up, drawing outwards, on the one hand, the middle of said bottom and, on the other hand, forcing said pressure plate against said heating body so as to assume a plane shape being in contact with the whole lower surface of said heating body.

In witness whereof I have signed this specification in the presence of two witnesses.

Dated the 10th day of August, 1921.

BRUNO MOEGLING.

Witnesses:
HELENE VON MIDES,
CLARA SCHELLENBERG.